United States Patent
Vega et al.

(10) Patent No.: US 11,838,392 B2
(45) Date of Patent: *Dec. 5, 2023

(54) EVENTING SYSTEMS AND METHODS TO FACILITATE ROBUST EVENT PROCESSING

(71) Applicant: BlueOwl, LLC, San Francsico, CA (US)

(72) Inventors: Jose Pons Vega, San Francisco, CA (US); Marco Ancheta, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,101

(22) Filed: Jun. 3, 2022

(65) Prior Publication Data
US 2022/0294879 A1    Sep. 15, 2022

Related U.S. Application Data

(63) Continuation of application No. 17/070,150, filed on Oct. 14, 2020, now Pat. No. 11,381,663.
(Continued)

(51) Int. Cl.
| | |
|---|---|
| *H04L 67/75* | (2022.01) |
| *G06F 16/245* | (2019.01) |
| *G06F 9/54* | (2006.01) |
| *G06F 16/23* | (2019.01) |
| *H04L 67/55* | (2022.01) |
| *G06Q 10/00* | (2023.01) |
| *G06Q 10/06* | (2023.01) |

(52) U.S. Cl.
CPC .............. *H04L 67/75* (2022.05); *G06F 9/541* (2013.01); *G06F 16/2358* (2019.01); *G06F 16/245* (2019.01); *H04L 67/55* (2022.05); *G06Q 10/00* (2013.01); *G06Q 10/06* (2013.01)

(58) Field of Classification Search
CPC ....... H04L 67/26; G06Q 10/00; G06Q 10/006
See application file for complete search history.

(56) References Cited

U.S. PATENT DOCUMENTS

2010/0332277 A1* 12/2010 Dentzer ................. G06Q 10/06
705/7.37
2011/0166975 A1* 7/2011 Williams ............... G06Q 10/00
709/224

(Continued)

*Primary Examiner* — Barbara B Anyan
(74) *Attorney, Agent, or Firm* — BRYAN CAVE LEIGHTON PAISNER LLP

(57) ABSTRACT

A device for facilitating event processing is presented. The device includes a transceiver, one or more memories including an event processing model, and one or more processors. The processors retrieve a new event from an application programming interface (API). The processors then parse the new event to determine a parsed event and store the parsed event in the memories. After determining the presence or absence of an additional new event via the API, the processors transmit a notification for display to a user indicating the parsed event and prompting a user to process the parsed event, resulting in either a successful or a failure processing signal. Responsive to receiving a failure processing signal, the processors schedule a subsequent notification for transmission to the user device according to an event processing model by using an exponential back-off and a random jitter.

20 Claims, 4 Drawing Sheets

Related U.S. Application Data

(60) Provisional application No. 62/916,023, filed on Oct. 16, 2019.

(56) References Cited

U.S. PATENT DOCUMENTS

| | | | | |
|---|---|---|---|---|
| 2012/0089432 | A1* | 4/2012 | Podgurny | G06Q 10/06311 |
| | | | | 705/7.13 |
| 2013/0290213 | A1* | 10/2013 | Deasaro | G06Q 10/06 |
| | | | | 705/345 |
| 2017/0322864 | A1* | 11/2017 | Nitsan | G06F 11/3065 |
| 2018/0189343 | A1* | 7/2018 | Embiricos | G06F 16/2358 |
| 2019/0102235 | A1* | 4/2019 | Dodge | H04L 67/26 |

* cited by examiner

EVENTING SYSTEMS AND METHODS TO FACILITATE ROBUST EVENT PROCESSING

CROSS-REFERENCES TO RELATED APPLICATIONS

This application is a continuation of U.S. patent application Ser. No. 17/070,150, filed Oct. 14, 2020, which claims priority to U.S. Provisional Patent Application No. 62/916,023, filed Oct. 16, 2019, the entire disclosures of which are incorporated by reference herein for all purposes.

FIELD OF THE DISCLOSURE

The present disclosure generally relates to facilitating event processing and, more particularly, to eventing systems and methods configured to increase processing throughput of new events retrieved via an application programming interface (API) by utilizing an event processing model.

BACKGROUND

Generally speaking, eventing systems allow clients to receive updates, alerts, and other relevant notifications related to their areas of interest. For example, mobile application (app) eventing systems allow clients to receive notifications related to the client's mobile apps, such as software updates, directly to the client's mobile device. However, traditional mobile app eventing systems have suffered from a variety of issues.

Broadly stated, traditional systems lack the ability to reliably process events. Traditional mobile app eventing systems are unable to effectively handle events that are received but not processed or stored before a mobile app is closed, events that are stored but are not properly processed, and removing events after they have been processed. Moreover, traditional systems fail to adequately prevent resource exhaustion when existing clients sign into new devices, do not actively adapt to be compatible with new events, and consistently disrupt event processing to existing clients when incorporating new clients.

BRIEF SUMMARY

In one embodiment, an event processing device for increasing processing throughput may be provided. The device may comprise a transceiver; one or more memories including an event processing model; and one or more processors interfacing with the transceiver and the one or more memories. The one or more processors may be configured to: retrieve a new event via an application programming interface (API); parse the new event to determine a parsed event; store the parsed event in the one or more memories; determine a presence or an absence of an additional new event via the API; responsive to determining the absence of the additional new event, transmit a notification for display to a user indicating the parsed event and prompting the user to process the parsed event; and responsive to receiving a failure processing signal, schedule a subsequent notification for display to the user according to an event processing model by using (i) an exponential back-off and (ii) a random jitter, wherein the subsequent notification indicates the parsed event and prompts the user to process the parsed event, and wherein the failure processing signal indicates the user did not process the parsed event.

In another embodiment, an event processing method for increasing processing throughput may be provided. The method may comprise: retrieving a new event via an application programming interface (API); parsing the new event to determine a parsed event; storing the parsed event in one or more memories; determining a presence or an absence of an additional new event via the API; responsive to determining the absence of the additional new event, transmitting a notification for display to a user indicating the parsed event and prompting the user to process the parsed event; and responsive to receiving the failure processing signal, scheduling a subsequent notification for display to the user according to an event processing model by using (i) an exponential back-off and (ii) a random jitter, wherein the subsequent notification indicates the parsed event and prompts the user to process the parsed event, and wherein the failure processing signal indicates the user did not process the parsed event.

In yet another embodiment, a computer readable storage medium comprising non-transitory computer readable instructions stored thereon for event processing to increase processing throughput may be provided. The instructions when executed on one or more processors may cause the one or more processors to: retrieve a new event via an application programming interface (API); parse the new event to determine a parsed event; store the parsed event in one or more memories; determine a presence or an absence of an additional new event via the API; responsive to determining the absence of the additional new event, transmit a notification for display to a user indicating the parsed event and prompting the user to process the parsed event; and responsive to receiving the failure processing signal, schedule a subsequent notification for display to the user according to an event processing model by using (i) an exponential back-off and (ii) a random jitter, wherein the subsequent notification indicates the parsed event and prompts the user to process the parsed event, and wherein the failure processing signal indicates the user did not process the parsed event.

Depending upon the embodiment, one or more benefits may be achieved. These benefits and various additional objects, features and advantages of the present disclosure can be fully appreciated with reference to the detailed description and accompanying drawings that follow.

The figures depict various aspects of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
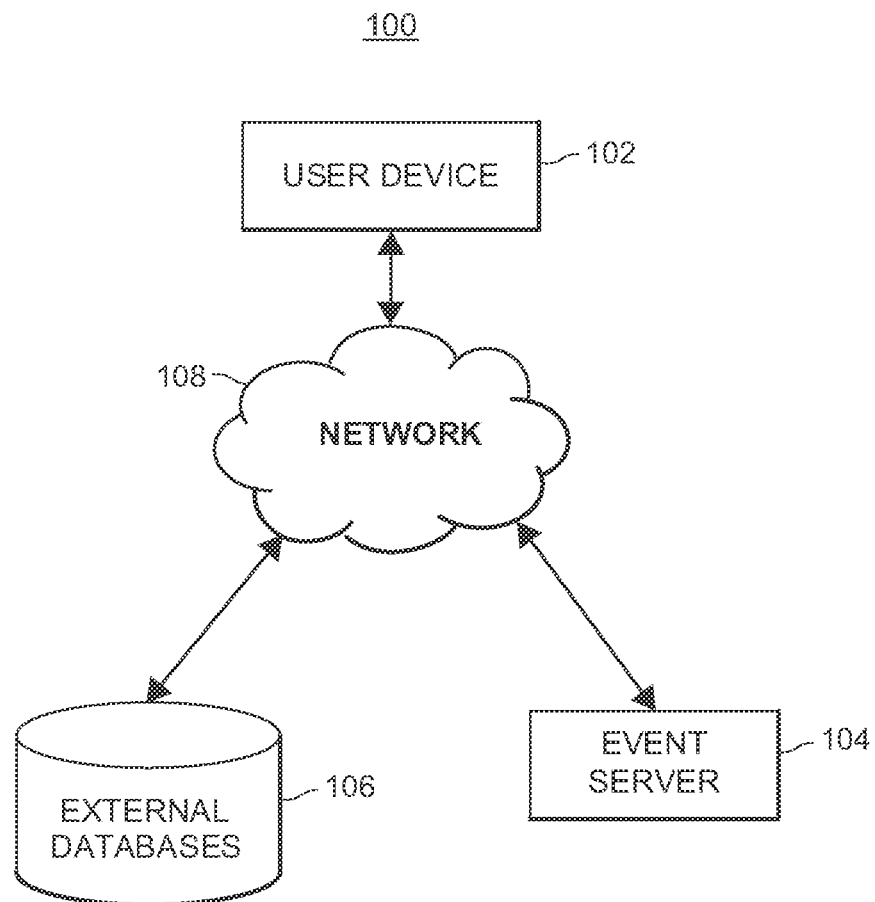
FIG. 1 illustrates an eventing system for facilitating event processing according to some embodiments.

I. Example Eventing System and Related Functionality for Facilitating Event Processing FIG. 1 illustrates an example eventing system 100 for facilitating event processing. The example system 100 may include a user device 102, an event server 104, external databases 106, and a network 108. While illustrated in FIG. 1 as a single external database, in some embodiments the external databases 106 includes two or more external databases. The network 108 may be a computer network of an insurance provider (e.g., provided or used by the insurance provider or communications over which the insurance provider otherwise controls or facilitates). The user device 102, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

Figure 2:
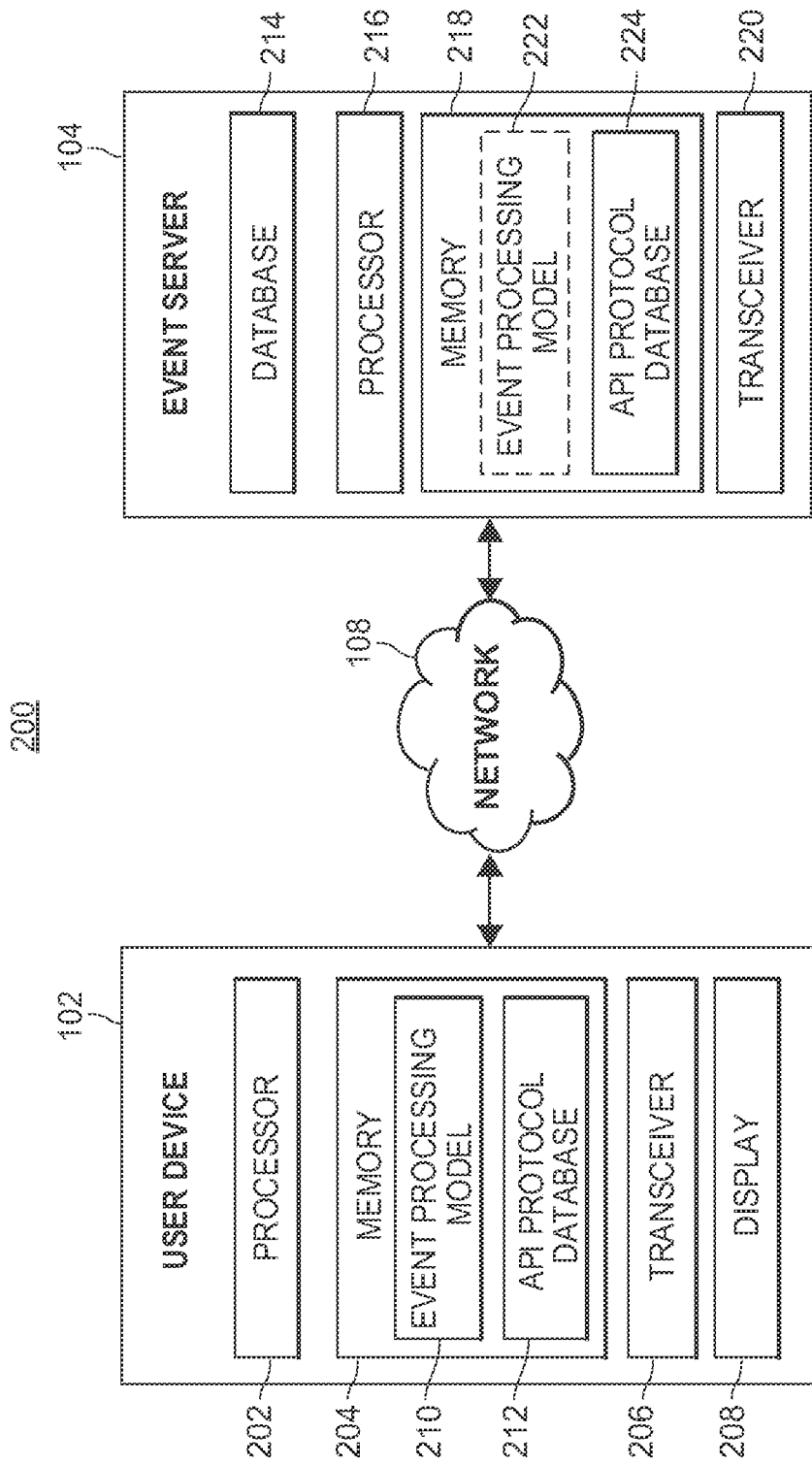
FIG. 2 illustrates another eventing system for facilitating event processing according to some embodiments.

FIG. 2 illustrates another eventing system for facilitating event processing according to some embodiments. In reference to the example eventing system 200 of FIG. 2, the user device 102 may include a processor 202, a memory 204, a transceiver 206, and a display 208. While referred to herein as a "processor" and a "memory," in some embodiments the processor 202 includes two or more processors and the memory 204 includes two or more memories. The memory 204 may include an event processing model 210 and an API protocol database 212, and may store computer-executable instructions, which may be executed by the processor 202.

The event server 104 may include a database 214, a processor 216, a memory 218, and a transceiver 220. In embodiments, the memory 218 may include an event processing model 222 and an API protocol database 224. The event server 104 may be connected to the user device 102 and any external databases (not shown, e.g., external databases 106) via the network 108, such that all devices (102, 104) may communicate to each other via their respective transceivers (206, 220). For example, the event server 104 may transmit a notification including an event to the user device 102 for processing. The user device 102 may receive the notification and display the notification to the user via the display 208. In response, the user device 102 may generate a successful processing signal or a failure processing signal. As used herein, the user device 102 may generate such signals in response to a user actively interacting with a notification (e.g., acknowledging the notification to generate a successful processing signal), by the user passively interacting with a notification (e.g., interacting with the application to which the notification refers to generate either a successful or failure processing signal), and/or by the user not interacting with the notification (e.g., the user disconnects from the application prior to acknowledging the notification, generating a failure processing signal).

Moreover, and in embodiments, the user device 102 may transmit these signals to the event server 104, indicating the user did or did not successfully process the event included in the notification. The event server 104 may store this received signal in its database 214 and/or its memory 218. Thus, and as discussed further herein, the event server 104 may be configured to process, analyze, or otherwise interpret data received from the user device 102.

For example, the user device 102 may transmit a request for new events to the event server 104 via an API. The user device 102 may transmit such a request using its API protocol database 212 to select the specific communication protocol needed (as identified in the API protocol database 224) to successfully transmit a request for new events to the event server 104 across the network 108. The event server 104 may then receive the request from the user device 102, and analyze the request, based at least in part upon the API utilized. The event server 104 may access its database 214 to retrieve any new events and may package all new events retrieved from the database in a single signal for transmission to the requesting device 102. Each package generated by the event server 104 may be unique to the user device 102 from which the request originated. In other words, each user device 102 may have a unique set of notifications that have not yet been received (e.g., new events), and thus will have a unique package of notifications generated by the event server 104 in response to a request.

The event server 104 may transmit event notifications to the user device 102 and/or receive event notifications from external databases through the network. The event server 104 and/or the user device 102 may store the event and/or a successful/failure processing signal in memory 204, 218. It will be appreciated that the event server 104 and/or user device 102 may be a server and/or device provided by or used by an insurance provider or use of which the insurance provider otherwise controls or facilitates.

As mentioned herein, the memory 204 may include an event processing model 210. The processor 202 may be configured to facilitate event processing via the event processing model 210. The event processing model 210 may be a dynamically updated event processing model, and the client device 102 may update the model 210 through, for example, machine learning algorithms. These machine learning algorithms may include neural networks, deep learning algorithms, regression algorithms, Bayesian algorithms, clustering algorithms, and/or any other suitable updating technique or combination thereof. Moreover, and in embodiments, the event server 104 may also have an event processing model. The server's 104 model may perform similar algorithmic analysis but may be limited with regard to the information used during its analysis. For example, the server 104 may receive a request for new events from the user device 102 via the API protocols contained in the respective databases (212, 224). While processing the request, the server 104 may determine that the user device 102 has not yet received a large number of events. In response, the server 104 may further determine, via the model 222, that only a select number of the total new events should be transmitted to the user device 102 because transmitting all new events would be overwhelming (either to the user or the device 102), would severely bottleneck processing speeds on the device 102 or over the network 108, or would cause another identifiable issue. Hence, the server 104 may generate a package of new events for transmission to the user device 102 containing fewer than all the new events requested, in accordance with the determination yielded by the server's 104 model 222.

Moreover, the device 102 (e.g., via the processor 202) may dynamically update the model 210 in response to user inputs and/or received notifications via an API fetch. For example, a particular notification may need input from the user beyond simply acknowledging the event in order to fully process. Correspondingly, the user may input information in response to the displayed notification, and the user device 102 may then receive all or part of the input information. The device 102 may then, via the processor 202, analyze this input information to determine which portion, if any, of it should be included in and/or otherwise inform the model 210. To illustrate, the device 102 may determine that a portion of the input data indicates that the user may be interested in additional event types beyond the event type represented by the event in the notification. Thus, the device 102 may update the model 210 to include events corresponding to the additional data types in a subsequent notification. Thereafter, the device 102 may further update the model 210 based at least in part upon the user's response(s) to the subsequent notifications. The device 102 may also update the model 210 based at least in part upon the success and/or failure rate of particular event types, data types, and/or any other suitable grouping metric or combination thereof. Moreover, and as discussed further herein, any notifications that fail to process a threshold number of times may be removed from the model 210 such that similar events will not be pushed to a user (e.g., via the event server 104) for processing.

The event processing model 210 may contain information relevant to processing events. For example, the model 210 may contain event profile information of one or more users. This event profile information may include historical notification information, event data indicators, event type indicators, and/or any other information to facilitate event processing. The profile information may, for example and as discussed further herein, facilitate event processing by allowing both the user device 102 and the event server 104 to develop a broader knowledge base with which to determine the events for display.

In embodiments, the processors 202 may access the model 210 to retrieve a portion or all of the event profile information and/or any other information included thereon to assist in event processing, as described herein. The processors 202 may thereafter use the retrieved information to further develop/update the event processing model 210. For example, the user device 102 may use the retrieved information to, at least partially, train the event processing model 210. If a new user begins using the device 102 that subsequently connects to the event server 104, via the network 108, the device 102 may need to train the model 210 to effectively determine event processing parameters. Thus, the event profile information may help the device 102 train the model 210 by providing user specified parameters, such as retry time for notifications, data types of interest, etc.

The display 208 may be configured to display one or more events. For example, the user device 102 may be configured to receive communications from the event server 104 and/or other suitable transmitters (e.g., external databases 106). The event server 104 may transmit an event to the user device 102, wherein the transceiver 206 will receive the event and the processor 202 will execute instructions to facilitate display of the event on the display 208.

In embodiments, the network 108 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 108 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example systems (100, 200) facilitate event processing, and allow various advantages. First, the systems (100, 200) store events that have not been successfully processed. Thus, the systems (100, 200) do not suffer from skipping events where a user (client) does not adequately process an event prior to closing the related application. Storing the events further allows the system (100, 200) to send the unprocessed events to clients if the clients did not have an opportunity to receive the events, and to delete the events after they are no longer useful. Second, the systems (100, 200) provide the events in a fluid, accessible manner. This allows multiple clients to seamlessly receive (listen) to multiple events simultaneously, a single client to listen to a single event, or any combination thereof. Third, the systems (100, 200) handle error conditions on the processing side (e.g., at event server 104), and thus avoid transmitting malformed events to users, and provide clients with flexibility regarding notification receipt. Clients may choose retry times for event notifications at any point throughout the event processing process and may even set preferences associated with ideal conditions under which to receive event notifications. Taken together, these advantages, among others, greatly increase the throughput and efficiency of traditional systems, and thus create a more robust eventing system through the dynamic, adaptive architecture disclosed herein.

II. Example Operational Embodiments of the Eventing System

Figure 3:
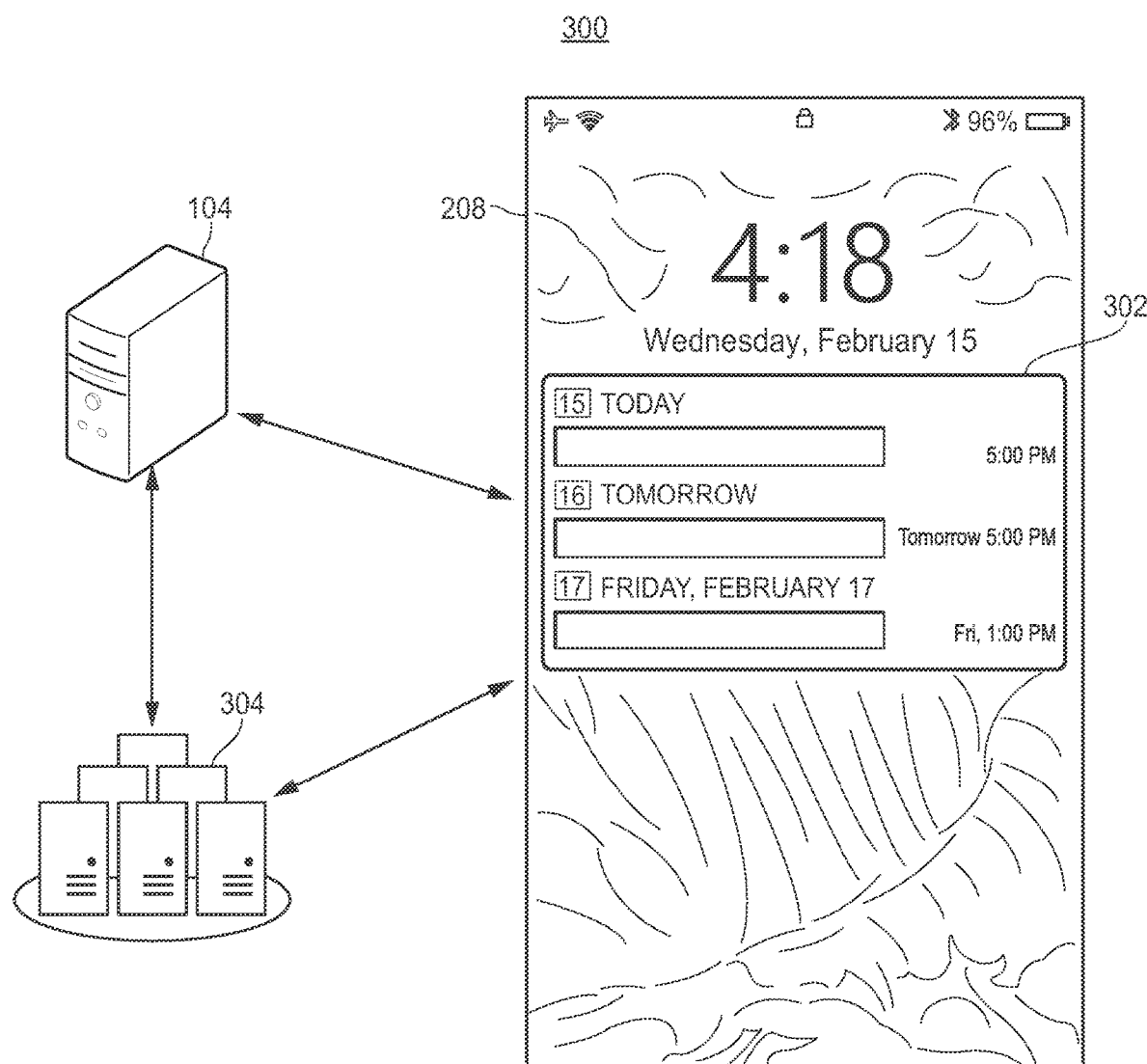
FIG. 3 depicts an operational embodiment of the eventing system of FIG. 2 according to some embodiments.

FIG. 3 depicts an operational embodiment 300 of, for example, the eventing system 200. The operational embodiment 300 includes the event server 104, the display 208 of the user device 102, a plurality of events 302, and an API protocol 304. The event server 104 may be a single server (as illustrated), an array of servers, a single server in conjunction with a parallel array of servers, and/or any combination thereof. In any event, the event server 104 may be configured to communicate with the user device 102, such that the user device 102 may display any transmissions (e.g., event notifications) from the event server 104 on the display 208.

For example, a user device (e.g., user device 102) may transmit a request to the event server 104 via the API protocol 304. The event server 104 may receive the request from the device and generate a package of events that the client's application has not yet received. The server 104 may then transmit the package of events to the device via the API 304. Once received, the device may display each received event on its display 208. As illustrated, the events 302 may appear as part of a graphical user interface (GUI) on the display 208. The GUI may facilitate the user interacting with the displayed events 302 and may further facilitate processing the events 302.

Each of the events 302 may be related to an application currently installed on the user device. The event list 302 may include only events from a single application, or from a plurality of applications. Moreover, the device may organize the events 302 in such a way to facilitate the user processing the events faster. For example, the device may organize the events 302 such that all events relating to a singular application are grouped together on the display 208. Additionally, or alternatively, the device may group the events 302 together based at least in part upon their individual dates of receipt and/or may list newer events ahead of older events. To illustrate, events that were received and/or generated earlier at the event server 104 may be less relevant to a user than events that were more recently received and/or generated. Thus, to maximize the likelihood that a user acknowledges and/or processes these newer events, the device may list them ahead of the older events.

The list of events 302 may be displayed to a user while the user is accessing a related application. For example, assume a device has 4 unique applications. Each of the applications may have 3 new events that have not yet been transmitted to the device for user processing. In that case, the device may delay transmitting requests for new events related to each of the applications until each respective application is opened and/or used by the user. Once any of the respective applications are opened and/or used, the device may transmit the request for new events related to the respective application via the API 304. The event server 104 may receive the request and generate a package of the 3 new events related to the respective application currently open and/or actively used by the user. Moreover, upon receipt of the package, the device may display the events 302 on the display 208, or the device may display the events 302 within the GUI generated by the respective application. Should the user discontinue using the respective application and/or become disconnected from the network (e.g., network 108) prior to the device receiving the 3 new events, each of the events may be stored in memory for later processing, in accordance with various embodiments herein.

In embodiments, the device may display events 302 on the display 208 based at least in part upon similar event data. In reference to the above example, and as explained further herein, assume that at least 2 of the 4 unique applications on the device had a new event containing the same or similar event data. In that case, when the device transmits a request for new events related to a respective application, via the API 304, the event server 104 may again generate a package of the 3 new events related to the respective application currently open and/or actively used by the user. However, the event server 104 may also retrieve new events related to the other 3 respective applications on the device if the server 104 determines the events contain the same or similar event data. The server 104 may perform this determination, for example, based at least in part upon an event processing model (e.g., event processing model 222). Correspondingly, the server 104 may generate and transmit a package of new events containing both the 3 new events for the respective application currently open and/or actively used by the user and any new events for the other respective applications that contain the same or similar event data to the device. Once received, the device may display the events (e.g., events 302) on the display 208. The display 208 may be a general display of the device (as illustrated) or the display 208 may be an application-specific display (e.g., a display generated by an application when opened by the user). Moreover, the device may display each of the 3 new events related to the currently open and/or actively used by the user as well as the new events for the other respective applications while on the same general display 208 or application-specific display.

III. Example of a Method for Facilitating Event Processing

Figure 4:
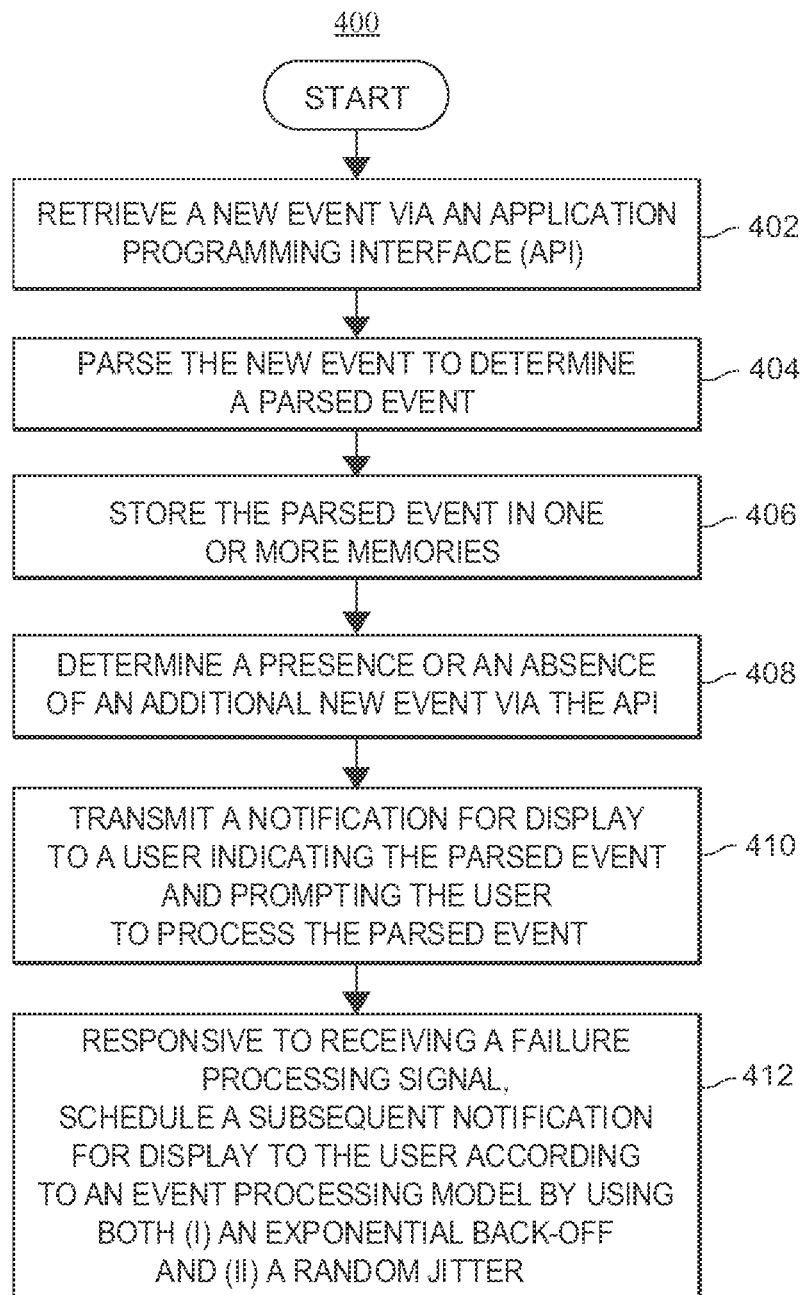
FIG. 4 is a flowchart depicting a method according to some embodiments.

FIG. 4 is a flowchart depicting an example method 400 corresponding to various embodiments of the present disclosure. The method 400 begins at block 402 where, for example, a device (e.g., event server 104) retrieves a new event via an API (e.g., API 304). As discussed further herein, the API utilized by the device may be any suitable API for retrieving new events related to an application currently open, actively used, and/or closed but installed on the device. For example, in embodiments, a device (e.g., user device 102) may transmit a request for new events related to an application a user has not accessed for an extended period of time. Thus, in these embodiments, the device 102 may track usage rates for each application installed on the device 102 (e.g., stored in memory 204). The device 102 may then automatically transmit requests for new events for applications whose usage rate indicates it has not been active in longer than a threshold duration, and thus should be updated. Block 402 may be performed by, for example, the event server 104.

Practically, the device 102 may transmit such requests for new events when an application is opened/activated by a user. In this way, the device 102 may conserve battery life and processing power by not accessing applications to check for updates, or a lack thereof, when the applications are not used by the user. Moreover, the device 102 may more efficiently process the requests themselves when the device 102 allocates processing bandwidth for active applications.

In any event, the device 102 may transmit the request(s) to the device 104 via an API protocol (e.g., API 304). The API protocol may further increase the processing efficiency of the system by readily and easily facilitating the communication between the two devices (102, 104). Accordingly, any events retrieved from the event server 104 via the API may be transmitted to the device 102 in a pre-determined format (e.g., JavaScript Object Notation (JSON), Extensible Markup Language (XML), or any other suitable format or combination thereof). However, as described further herein, the pre-determined format may be modified by parsing the retrieved events to identify various elements of data.

In embodiments, the device 102 will include user-specific data in the request for new events. The user-specific data may include a specified time and environmental criteria. The specified time, as discussed further herein, may reference a duration after initial event processing failure when the server 104 will send a subsequent notification to the device 102 to allow the user another opportunity to process the events included therein.

For example, the server may push an initial notification to the user device in response to a request for new events. However, the user may have closed the application, lost a connection to the network, and/or may not otherwise process the events contained in the notification and displayed on the device 102. Consequently, the device 102 may generate and transmit a failure processing signal to the server 104 indicating that the user failed to process the event. Thus, the server may begin recording the period of time following receipt of the failure processing signal until the server determines the period of time following receipt exceeds the specified time received from the user. After the server makes this determination, the server may re-transmit the notification to the user device for display to the user. It is to be understood that the server may re-transmit an identical notification to the initial notification containing the new events, the server may transmit a different notification from the initial notification that contains the new events, and/or the server may transmit a notification containing combinations of identical notifications for a first set of new events and different notifications for a second set of new events related to a single application, multiple applications, and/or any combination thereof.

The environmental criteria may include conditions under which the user prefers to receive notifications of events. For example, the user may specify that the event server should only transmit event notifications when the user device has a strong connection to the network. Additionally, the user may specify that the event server should only transmit event notifications when the user device has been connected to the network for a particular duration. To illustrate, the user may recognize that a trip they intend to take will place them in locations with inconsistent and/or weak network coverage. The user may want to preserve their available bandwidth during these periods of inconsistent/weak network coverage by prioritizing other functions of the user device (e.g., mapping/routing applications, etc.). Thus, the user may specify that the event server should only attempt to transmit event notifications once the user device has maintained a consistent/strong network connection for greater than 20 minutes. Correspondingly, the user device may transmit a signal to the event server each time it connects to the network and opens or enables a particular application to notify the server of its connected status. Either the event server or the user device may then track the amount of time the device is connected to the network, and may monitor the real-time, average, or other metric concerning the strength of the device's connection. Once the device's connection satisfies the durational needs of time and/or strength, either the device or the server may transmit signals to facilitate displaying event notifications for the user to process.

Moreover, the environmental conditions may encompass predictive connectivity capabilities. Similar to the above example, the user may know a planned trip, weather conditions, or some other pending situation may impact their ability to connect to the network. Thus, either the event server and/or the user device may track the expected connectivity of the user device to the network along a planned route, over a particular period of time, or when analyzing some other suitable indicator. The user device and/or event server may both track the connection status of the user device in real-time and predict the device's future connection status. If the user inputs a planned route into the device, the device may recognize that a particular area along the planned route typically has inconsistent and/or weak connectivity to the network. The device may also recognize that an area along the planned route has a forecast weather pattern that traditionally may interfere with network connectivity. In any event, the device and/or server may track these and other indicators to determine the expected connectivity of the device at future points and may plan event notification pushes accordingly. For example, if the user enables a functionality of the user device to track and predict its connectivity status for this notification purpose, the device may communicate with the event server to plan new event checks and/or notification pushes to the device during periods when the device is most likely to have a strong connection to the network and the bandwidth to accommodate such notifications.

In embodiments, the device and/or server may retrieve a set of stored historical notification records indicating (i) a retry timing preference of the user and (ii) a notification importance preference of the user. As discussed further herein, the user may specify a period of time the event server should wait before resending a particular event notification. However, instead of receiving a retry timing preference each time the device transmits a request for new events, the server and/or the device may record historical retry timing preferences of the user to enable predictive determinations of the user's preferred retry time for any given event notification. If the user consistently prefers retry times of 30 seconds, the server may automatically assume, in the case where the server receives a request for new events without a specified retry time, that the user will prefer a 30 second retry time for any future subsequent notifications in response to receiving a failure processing signal. It will be appreciated, that data aggregation with respect to the user may take place at the event server (e.g., memory 218), the user device (e.g., memory 204), any other suitable storage device (e.g., external databases 106) or any combination thereof.

The notification importance preference of the user may refer to the user's historical processing rates of particular event notification types. For example, the device may track the user's processing success rates for each application installed on the device. Further, for any particular application, the device may more granularly track the user's processing success rates for the various event types, event data, and other differentiators of the particular application's notifications. Thus, the device may prioritize certain events over others if they have a higher successful processing rate because the device may determine the user prioritizes such events. Correspondingly, the device may create a prioritization model for each event type, event data, etc. for each application, or for the applications as compared to one another. It should be appreciated that the prioritization model may be constructed by the user device, event server, any other suitable device (e.g., external databases 106) or any combination thereof. As further discussed herein, the prioritization model may be included in the event processing model.

To illustrate, and in embodiments, the device and/or server may store a set of profile features associated with the user. The set of profile features may include (i) an event data indicator and (ii) an event type indicator. These indicators may describe the information contained in events retrieved from the event server. For example, the event data indicator may contain information relating to the data contained in an event notification to be sent to the user device for user processing. This information may include the text to be displayed to the user, the actions to be taken by the user device in response to the user processing the event, or other suitable indications or combinations thereof. Similarly, the information included in the event type indicator may describe the type of event provided in a particular notification. The types of events may vary depending on the application and the application's particular function. Gaming applications may receive different types of events than mapping applications, internet browsing applications, storage applications, or any other type of application stored on the user device. Regardless, the device and/or server may store the event data indicators and event type indicators after the new events are parsed.

Accordingly, the method 400 continues at block 404 by parsing the new event to determine a parsed event. The parsing may take place in order to identify portions of the new event and ensure that the new event contains the needed portions in order to be processed by the user. For example, a particular new event may need a particular code set in order to successfully transfer to the user device via the API, display on the user device, achieve the intended result of the event (e.g., update an application) or any other potential pitfall of a malformed event or combination thereof. Moreover, the particular sets of code may need to have a particular configuration/language to be recognized by a compiler, interpreter, translator, and/or any other component of the event server/user device network or combinations thereof. Block 404 may be performed by, for example, the event server 104.

Thus, the event server may parse the new event to identify the relevant portions of code included therein. As previously mentioned, the new event may include event data indicators and/or event type indicators, among others. Once the server completes the parsing operation, these indicators will be identified by the server and included in the packaged notification pushed to the user device in response to the request for new events.

In embodiments, the server may determine the specified time to retry the notification, an importance indicator associated with the parsed event, and a retry threshold associated with the parsed event based at least in part upon the set of historical notification records after parsing the new event. In this way, the server will establish these operational parameters before ever sending the initial notification and will thereby save processing time. Moreover, after parsing the new event, the server will have access to the event type and event data indicators. Thus, and in accordance with embodiments described herein, the server may prioritize the parsed event based at least in part upon its associated indicators. If the server analyzes the event type and event data indicators and determines, based at least in part upon historical notification records or other real-time indications, that the event is low priority for the user, the server may assign the event a long retry time (specified time) and a correspondingly low retry threshold. Accordingly, if the user fails to process the event, the server will wait a relatively long time before retrying the event notification and will only store the event for a relatively low number of retries (or for a short period of time) because the event is low priority to the user.

Regardless of the event's priority, the parsed event will be stored in one or more memories, as shown at block 406. To facilitate many of the advantages associated with the present disclosure, the server may store the parsed event in memory (e.g., memory 218). For example, the server may store the parsed event in memory to enable resending the notifications when the user is unable to successfully process the event. If a user disconnects from the network before receiving and/or processing the event, the event may not be stored on the local device. Thus, if the event is not stored on the server, the event may be lost for that device. Storing the event on the server overcomes this limitation because it does not depend on the local storage of the user device. Block 406 may be performed by, for example, the event server 104.

In embodiments, storing the parsed event comprises storing a set of metadata corresponding to the parsed event. The set of metadata may include (i) a number of failure processing signals, (ii) a specified time to transmit the subsequent notification, and (iii) an environmental criteria indicating when to transmit the subsequent notification. The number of failure processing signals may indicate, for example, the number of times the user has failed to successfully process the event contained in the notification. Each time the user has failed to do so, the user device may transmit a failure processing signal to the event server. The event server may receive this signal, and update a counter devoted to recording the total number of times the event has not been successfully processed by the user. This recording may eventually reach a threshold level, such that the server will delete the event and stop retransmitting the corresponding notification if the user fails to process the event the threshold number of times.

As further described herein, a specified time to retransmit the notification may be set by the user and/or inferred by the event server or other device. However, the specified time to retransmit may also be contained in the metadata extracted by the server in response to parsing the new event. For example, the inherent design of the event may include a retry time because the event is a time sensitive event. Otherwise, the event designer may simply have included such a retry time in the design of the event to expedite processing or standardize the designer's event structure. For similar reasons, the metadata may contain environmental conditions, as also described herein.

The method 400 continues at block 408 by determining a presence or an absence of an additional new event via the API. Generally speaking, and as described elsewhere herein, prior to sending event notifications, the event server creates a package (or batch) of parsed events to be sent to the user device. Transmitting the notifications in this way reduces processing time, and thus makes the notification process more efficient. Thus, before the event server transmits an event notification, the server may check for any other new events that should be sent to the user device for processing. However, in embodiments, the event server may not check for any other new events before sending the currently parsed events to the user device. In these embodiments, the event server may simply send the batch of parsed events to the user device and check for any new events some time afterwards. Block 408 may be performed by, for example, the event server 104.

In embodiments where the event server stores a set of profile features related to the user, the server may retrieve the set of profile features from the one or more memories. As described elsewhere herein, the set of profile features may include event type indicators and/or event data indicators typically associated with the user. For example, if the user consistently uses a particular application, the set of profile features may indicate a strong association with event types and event data indicative of that particular application. Thus, the server may develop a user profile model to more accurately determine corresponding events, and to provide alternative/additional events the model predicts would be useful to the user. As further discussed herein, the user profile model may be included in the event processing model.

Practically, the API may also need to accommodate the recommendations made by the server's model and would thus need to accommodate a more general set of communication protocols without sacrificing the efficiency of the API architecture. For example, in a linear architecture, a particular event server may process requests for new events corresponding to multiple applications (e.g., a company or corporation with multiple applications). Thus, the API designed for that particular event server may accommodate recommended events from the server's model because the API will likely be configured to retrieve/transmit new events related to each of the different applications.

Further in these embodiments, the event server may compare the parsed event to the set of profile features. The comparison may, for example, attempt to determine matches between portions of data. Parsed event data indicators may be compared to the profile event data indicators, and parsed event type indicators may be compared to the profile event type indicators. As will be appreciated, any parsed event element or portion of any parsed event element may be compared to any profile element or portion of any profile element.

Also, in these embodiments, and as discussed elsewhere herein, the server may track, store, or otherwise access an event index. The event index may indicate, for example, the number of total events associated with a particular application. Hence, when a user device requests new events related to the particular application, the user device can submit the total number of events related to the application currently stored on the user device. The API can then transmit the request by checking with the event index of the server. If the event index matches the number of events currently stored on the user device, then the API can report that there are no new events to be processed with respect to the particular application referenced in the request. Alternatively, if the API receives an indication from the server that the event index exceeds the number of events currently stored on the user device, then the API has identified that new events exist on the event server that should be pushed to the user device for processing.

Thus, in these embodiments where the server compares the parsed event to the set of profile features in an attempt to determine matches between portions of data, the server or API may update the event index based at least in part upon identifying a match between the event type indicator and the parsed event. For example, if the server retrieves an otherwise unrequested event (e.g., for an application not referenced in the request), parses the unrequested event, compares the parsed event to the event type indicator (or event data indicator) included in the user profile model, and identifies a match, the server may also update the event index to indicate the addition of new events that are relevant to the user that have not been pushed to the user device for processing.

Still further in these embodiments, responsive to identifying the match between the event type indicator and the parsed event, the event server may update the event processing model (including the user profile model) by including the event data indicator associated with the parsed event and the event type indicator associated with the parsed event. Thus, the server and the corresponding API may more efficiently process future requests for new events by facilitating larger batches for events relevant to the user.

After updating the event processing model, the API may request, and the server may retrieve an additional new event. The server may then parse the additional new event to determine an additional parsed event and store the additional parsed event in the one or more memories (e.g., memory 218). Once stored, the server may compare the additional parsed event to the set of profile features, and the server may fail to identify a match between the event type indicator (or event data indicator) included in the event processing model and the additional parsed event.

However, despite failing to identify the match, the server may update the event index by automatically associating the additional parsed event with the user based at least in part upon the event processing model. In this instance, the server may proceed to update the event index and transmit the additional parsed event to the user device via the API because the server may recognize a substantial similarity between the event type indicator (or event data indicator) and the additional parsed event. As mentioned elsewhere herein, the event processing model may develop to a point where the server may use the model to make predictive associations between user preferences and unrequested new events. Thus, the server may update the event index in instances where there is not an identical match between the event type indicator (or event data indicator) and the additional parsed event, but there is a sufficient statistical similarity in accordance with tolerances established by the sophistication and developmental stage of the event processing model.

The method 400 continues at block 410 by, responsive to determining the absence of the additional new event, transmitting a notification for display to a user indicating the parsed event and prompting the user to process the parsed event. The transmission may result in the user device displaying the notification on the device display (e.g., display 208), as illustrated, for example, in FIG. 3. When the notification appears on the display for processing by the user, the notification may only appear for a transitory duration or may remain on the display. The notification may remain on the display until the corresponding application closes, the user turns off the user device, the user loses connectivity to the network, or for any other suitable reason. The notification may prompt the user to process the event by explicitly requesting the user to process the event (e.g., via an alphanumeric message to that effect and/or an audiovisual indication of the notification's presence (e.g., one or more audio files play when the notification is received and displayed)), displaying a user selectable interface wherein the user selectively interacts with the notification to process the event, merely by virtue of the notification's display on the user device, or through any other suitable means. Block 410 may be performed by, for example, the event server 104.

The method continues at block 412 by, responsive to receiving a failure processing signal, scheduling a subsequent notification for display to the user according to an event processing model by using (i) an exponential back-off and (ii) a random jitter. The subsequent notification may indicate the parsed event and may prompt the user to process the parsed event. Moreover, the failure processing signal may indicate that the user did not process the parsed event.

As a general principle, exponential back-off may refer to the process of exponentially increasing the interval lengths between iterations of a particular procedure. Here, the exponential back-off applied to the subsequent notification via the event processing model exponentially lengthens the retry times associated with subsequent notifications of a particular parsed event. Thus, each time the parsed event is transmitted to the user device and the user device returns a failure processing signal, the event server will exponentially increase the duration of the retry time for any subsequent notification for the parsed event.

To illustrate, assume the event server transmits a parsed event to the user device via the API, and the user device returns a failure processing signal. Further, assume that the retry time associated with the parsed event's subsequent notification is 30 seconds. The event server may then send the subsequent notification corresponding to the parsed event after 30 seconds have elapsed from the event server's receipt of the failure processing signal. Should the user device transmit a failure processing signal in response to receiving the subsequent notification, the event server may exponentially increase the retry time of the parsed event for a second subsequent notification from 30 seconds to 2 minutes. Thus, for each subsequent failure processing signal, the event server may increase the retry time from 2 minutes to 10 minutes, from 10 minutes to 45 minutes, from 45 minutes to 3 hours, etc. In embodiments, the amount (rate) of back-off applied, specific intervals, and any other configurable aspects of the exponential back-off procedure may be configurable by the user and stored on event server memory, transmitted by the user device, and/or any other suitable configuration method or combination thereof. Moreover, the event server may automatically adjust the exponential back-off based at least in part upon the retry threshold. For example, if the retry threshold for a particular parsed event is only 2 retries, the event server may apply a greater amount of exponential back-off to subsequent notifications to increase the chances that the parsed event is successfully processed by the user.

This procedure is greatly beneficial by reducing processing bottlenecking through de-emphasizing non-important events and conserving battery and processing power. In other words, if a parsed event is consistently not processed by the user, the event server may determine the parsed event is not important to the user, and thus should not consume processing resources over other potentially more important events. Moreover, reducing the number of overall notification retries reduces the amount of processing power used, and correspondingly decreases the battery power consumed/ energy resources spent by the event server and user device.

Random jitter may describe the procedure of adding random noise to signals in order to stagger their placements, orderings, or other listing methodology. Here, the random jitter applied to the subsequent notification via the event processing model incorporates random noise signals to each retry time associated with the subsequent notifications. For example, assume the event server retrieves 3 new events (A, B, C) for transmission to the user device. In order to avoid consuming excess processing bandwidth and bottlenecking the corresponding processing speeds for each notification, the server may apply random noise signals (random jitter) to each parsed event's notification transmission time. Thus, after random jitter application, parsed event A may be transmitted to the user device first, parsed event B may be transmitted to the user device 1 second after parsed event A, and parsed event C may be transmitted to the user device 1 second after parsed event B.

As will be appreciated, the random jitter applied in practice may not be uniform across all randomized events, and not all events being randomized will result from the same request from the user device. Thus, as another example, assume the event server retrieves 1 new event (A) for transmission to the user device. Further, assume that the event server has 40 parsed events (1-40) in storage that are awaiting transmission via subsequent notifications through the API to the user device. In order to avoid consuming excess processing bandwidth and bottlenecking the corresponding processing speeds for each notification, the server may apply random noise signals (random jitter) to the notification transmission times of the newly parsed event A as well as each parsed event awaiting a subsequent notification (1-40). Thus, after random jitter application, newly parsed event A may be transmitted to the user device first, and each of the previously parsed events (1-40) may be transmitted to the user device at random intervals following one another.

As yet another example, assume a user of a user device has been offline for an extended period of time. Further, assume that during the extended period of time, the event server (or other event accumulation component) accumulated a substantial number of events to transmit to the user device. When the user rejoins (reconnects) to the network, the event server could potentially flood the user device with new parsed events, which could exhaust the processing and/or power resources available to the server and/or user device. Thus, to avoid such flooding, the event server may apply random noise signals (random jitter) to the event notification sequence to allow the user to receive the multiple events in a manageable, sequential manner. Consequently, the user (and the user device) will not be simultaneously inundated with a deluge of events, such that the event server and user device will reduce the cumulative amount of resources used to display the event notifications to the user.

Moreover, as should be understood, both the exponential back-off and the random jitter may be applied to the initial notification transmissions as well as to the subsequent notification transmissions. Additionally, in embodiments where the events are prioritized (either by the server or by the user device), the random jitter and or exponential back-off may be applied such that the higher priority events are transmitted ahead of the lower priority events.

Thus, in embodiments, the event server may determine a retry time indicative of a duration after transmitting the notification, and subsequently use the exponential back-off by iteratively applying an exponential factor to the retry time following a receipt of a subsequent failure processing signal and use the random jitter by applying a noise signal to the retry time.

As mentioned elsewhere herein, and in embodiments, either the event server or the user device may store and update a retry counter corresponding to the number of failure processing signals received for a particular event. The server or user device may also store a retry threshold corresponding to the maximum allowable number of attempts to successfully process a particular event. Thus, after receiving each failure processing signal the server or user device may correspondingly increase the retry counter. Once the retry counter reaches and/or exceeds the retry threshold, the event server or user device may delete the parsed event from the one or more memories.

In this way, the methods of the present disclosure effectively utilize storage space of the server and/or user device by deleting the unprocessed parsed event and its retry counter instead of perpetually storing and retrying the parsed event notification. As with other aspects of the present disclosure, the types of events may be categorized by the user such that certain events are never deleted because the user prioritizes the events highly and does not wish to miss any of them. However, in general, the server and/or device may delete unprocessed events after a predetermined number of failed notifications to increase available storage space for future new events, and to increase processing efficiency by reducing the number of subsequent notifications transmitted by the event server to the user device.

Moreover, the event server and/or user device may delete the stored parsed event after receiving/transmitting a successful processing signal. The successful processing signal may indicate that the user processed the parsed event. The event server and/or user device may then determine that allocating storage space for the successfully processed parsed event's data is no longer needed, and may correspondingly delete that data. Thus, the event server and/or user device may consistently update and thereby generate more available storage space for future new events.

By providing systems and methods that allow facilitating event processing as described herein, various advantages are achieved. For example, the systems and methods provide and/or are implemented through the use of a device(s) that provide information particularly suited for use with other features of the systems and methods to facilitating event processing. Notably, the systems and methods provide a seamless, real-time solution to retrieving new events via an API, parsing and storing the new events, determining the presence or absence of additional new events via the API, transmitting notifications for display to a user to facilitate event processing, and automatically scheduling events that failed to process for subsequent notifications to a user. Other advantages include a variety of improvements over traditional eventing systems.

For example, the methods and systems of the present disclosure store events that have not been successfully processed. Thus, the methods and systems of the present disclosure do not suffer from skipping events where a user (client) does not adequately process an event prior to closing the related application. Storing the events further allows the methods and systems of the present disclosure to send the unprocessed events to clients if the clients did not have an opportunity to receive the events, and to delete the events after they are no longer useful.

Further, the methods and systems of the present disclosure provide the events in a fluid, accessible manner. This allows multiple clients to seamlessly receive (listen) to multiple events simultaneously, a single client to listen to a single event, or any combination thereof. Moreover, the algorithmic, dynamic architecture of the methods and systems of the present disclosure substantially reduce the bottlenecking of processing speeds typically encountered with traditional systems and methods.

Moreover, the methods and systems of the present disclosure handle error conditions on the processing side (e.g., at event server 104), and thus avoid transmitting malformed events to users, and provide clients with flexibility regarding notification receipt. Clients may choose retry times for event notifications at any point throughout the event processing process, and may even set preferences associated with ideal conditions under which to receive event notifications. Taken together, these advantages, among others, greatly increase the throughput and efficiency of traditional systems, and thus create a more robust eventing system through the dynamic, adaptive architecture disclosed herein.

As will be apparent from the above description, and as should be appreciated with respect to all examples presented herein, the functions or operations shown in FIG. 4 may be performed in any suitable order, any desired number of times, and/or with any suitable variation to the particular order and/or combination shown so as to achieve a desired result, such as a desired manner of facilitating event processing.

IV. Examples of Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing needs that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user device 102, the event server 104, and/or any other computing devices within the example system (100, 200) in any suitable combination). The routines may be included as part of any of the modules described in relation to FIG. 1 and/or 2 or as part of a module that is external to the system illustrated by FIG. 1 and/or 2. For example, the methods or portions thereof may be part of a browser application(s) or an application(s) running on any of the devices in the example system (100, 200) as a plug-in or other module of the browser application. Further, the methods may be employed as "software-as-a-service" to provide, for example, the user device 102, the event server 104, and/or any other computing devices with access to the example system (100, 200).

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of example systems (100, 200) and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for systems and methods for facilitating event processing. Thus, while particular embodiments and applications have been illustrated and described, it is to be understood that the disclosed embodiments are not limited to the precise construction and components disclosed herein. To the extent that any meaning or definition of a term in this document conflicts with any meaning or definition of the same term in a document incorporated by reference, the meaning or definition assigned to that term in this document shall govern. The detailed description is to be construed as examples only and does not describe every possible embodiment since describing every possible embodiment would be impractical, if not impossible. While particular embodiments of the present disclosure have been illustrated and described, it would be obvious to those skilled in the art that various other changes and modifications can be made without departing from the spirit and scope of the disclosure.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. An event processing device, the device comprising:
one or more memories including an event processing model; and
one or more processors interfacing with the one or more memories, and configured to:
retrieve a first event via an application programming interface (API);
parse the first event to determine a parsed event associated with a set of metadata corresponding to the first event;
transmit a notification to a user indicating the parsed event and prompting the user to process the parsed event;
receive a failure processing signal indicating that the parsed event has not been processed; and
schedule a subsequent notification to the user according to an event processing model using at least an exponential back-off based at least in part on the set of metadata;
wherein the subsequent notification indicates the parsed event and prompts the user to process the parsed event.

2. The event processing device of claim 1, wherein the set of metadata includes at least one selected from a group consisting of a number of failure processing signals, a specified time to transmit the subsequent notification, and an environmental criteria indicating when to transmit the subsequent notification.

3. The event processing device of claim 2, wherein the one or more processors are further configured to:
retrieve a set of historical notification records indicating a retry timing preference of the user and a notification importance preference of the user;
determine the specified time, an importance indicator associated with the parsed event, and a retry threshold associated with the parsed event based at least in part upon the set of historical notification records;
update a retry counter after receiving each failure processing signal; and
delete the parsed event from the one or more memories after:
the retry counter exceeds the retry threshold; or
the one or more processors receive a successful processing signal indicating that the parsed event has been processed.

4. The event processing device of claim 1, wherein the one or more processors are configured to schedule the subsequent notification by:
determining a retry time indicative of a duration after transmitting the notification; and
using the exponential back-off by iteratively applying an exponential factor to the retry time following a receipt of a subsequent failure processing signal.

5. The event processing device of claim 4, wherein the one or more processors are configured to schedule the subsequent notification by:
scheduling the subsequent notification using at least a random jitter by applying a noise signal to the retry time.

6. The event processing device of claim 1, wherein the one or more processors are further configured to:
receive a set of profile features associated with the user, the set of profile features including an event data indicator and an event type indicator;
compare the parsed event to the set of profile features; and
update an event index based at least in part upon identifying a match between the event type indicator and the parsed event.

7. The event processing device of claim 6, wherein the one or more processors are further configured to:
responsive to identifying the match between the event type indicator and the parsed event, update the event processing model by including the event data indicator associated with the parsed event and the event type indicator associated with the parsed event;
retrieve a second event from the API;
parse the second event to determine an additional parsed event;
compare the additional parsed event to the set of profile features; and
responsive to failing to identify the match between the event type indicator and the additional parsed event, update the event index by automatically associating the additional parsed event with the user based at least in part upon the event processing model.

8. An event processing method, the method comprising:
retrieving a first event via an application programming interface (API);
parsing the first event to determine a parsed event associated with a set of metadata corresponding to the first event;
transmitting a notification to a user indicating the parsed event and prompting the user to process the parsed event;
receiving a failure processing signal indicating that the parsed event has not been processed; and
scheduling a subsequent notification to the user according to an event processing model using at least an exponential back-off based at least in part on the set of metadata;
wherein the subsequent notification indicates the parsed event and prompts the user to process the parsed event.

9. The event processing method of claim 8, wherein the set of metadata includes at least one selected from a group consisting of a number of failure processing signals, a specified time to transmit the subsequent notification, and an environmental criteria indicating when to transmit the subsequent notification.

10. The event processing method of claim 9, further comprising:
retrieving a set of historical notification records indicating a retry timing preference of the user and a notification importance preference of the user;
determining the specified time, an importance indicator associated with the parsed event, and a retry threshold associated with the parsed event based at least in part upon the set of historical notification records;
updating a retry counter after receiving each failure processing signal; and
deleting the parsed event from one or more memories after:
the retry counter exceeds the retry threshold; or
one or more processors receive a successful processing signal indicating the user processed the parsed event.

11. The event processing method of claim 8, wherein scheduling the subsequent notification comprises:
determining a retry time indicative of a duration after transmitting the notification; and
using the exponential back-off by iteratively applying an exponential factor to the retry time following a receipt of a subsequent failure processing signal.

12. The event processing method of claim 11, wherein scheduling the subsequent notification further comprises:
scheduling the subsequent notification using at least a random jitter by applying a noise signal to the retry time.

13. The event processing method of claim 8, further comprising:
receiving a set of profile features associated with the user, the set of profile features including an event data indicator and an event type indicator;
comparing the parsed event to the set of profile features; and
updating an event index based at least in part upon identifying a match between the event type indicator and the parsed event.

14. The event processing method of claim 13, further comprising:
responsive to identifying the match between the event type indicator and the parsed event, updating the event processing model by including the event data indicator associated with the parsed event and the event type indicator associated with the parsed event;
retrieving a second event from the API;
parsing the second event to determine an additional parsed event;
comparing the additional parsed event to the set of profile features; and
responsive to failing to identify the match between the event type indicator and the additional parsed event, updating the event index by automatically associating the additional parsed event with the user based at least in part upon the event processing model.

15. A computer readable storage medium comprising non-transitory computer readable instructions stored thereon for event processing to increase processing throughput, wherein the instructions when executed on one or more processors cause the one or more processors to:
retrieve a first event via an application programming interface (API);
parse the first event to determine a parsed event associated with a set of metadata corresponding to the first event;
transmit a notification to a user indicating the parsed event and prompting the user to process the parsed event; and
receiving a failure processing signal indicating that the parsed event has not been processed;
schedule a subsequent notification to the user according to an event processing model using an at least exponential back-off based at least in part on the set of metadata;
wherein the subsequent notification indicates the parsed event and prompts the user to process the parsed event.

16. The computer readable storage medium of claim 15, wherein the set of metadata includes at least one selected from a group consisting of a number of failure processing signals, a specified time to transmit the subsequent notification, and an environmental criteria indicating when to transmit the subsequent notification.

17. The computer readable storage medium of claim 15, wherein the instructions when executed on the one or more processors cause the one or more processors to receive, from the user, at least one of a specified time and an environmental criteria.

18. The computer readable storage medium of claim 16, wherein the instructions when executed on the one or more processors cause the one or more processors to:
retrieve a set of historical notification records indicating a retry timing preference of the user and a notification importance preference of the user;
determine the specified time, an importance indicator associated with the parsed event, and a retry threshold associated with the parsed event based at least in part upon the set of historical notification records;

update a retry counter after receiving each failure processing signal; and delete the parsed event from one or more memories after:
   the retry counter exceeds the retry threshold; or
   the one or more processors receive a successful processing signal indicating that the parsed event has been processed.

19. The computer readable storage medium of claim 15, wherein the instructions when executed on the one or more processors cause the one or more processors to schedule the subsequent notification by:

determining a retry time indicative of a duration after transmitting the notification; and using the exponential back-off by iteratively applying an exponential factor to the retry time following a receipt of a subsequent failure processing signal.

20. The computer readable storage medium of claim 15, wherein the instructions when executed on the one or more processors further cause the one or more processors to:

receive a set of profile features associated with the user on one or more memories, the set of profile features including an event data indicator and an event type indicator; comparing the parsed event to the set of profile features, and update an event index based at least in part upon identifying a match between the event type indicator and the parsed event;

responsive to identifying the match between the event type indicator and the parsed event, update the event processing model by including the event data indicator associated with the parsed event and the event type indicator associated with the parsed event;

retrieve a second event from the API;

parse the second event to determine an additional parsed event;

store the additional parsed event in the one or more memories;

compare the additional parsed event to the set of profile features; and responsive to failing to identify the match between the event type indicator and the additional parsed event, update the event index by automatically associating the additional parsed event with the user based at least in part upon the event processing model.

* * * * *